United States Patent [19]

McLaughlin

[11] 4,238,887
[45] Dec. 16, 1980

[54] QUICK RELEASE BALL BEARING HEIGHT GAUGE

[76] Inventor: John McLaughlin, 46 Spring St., Brockton, Mass. 02401

[21] Appl. No.: 946,338

[22] Filed: Sep. 27, 1978

Related U.S. Application Data

[63] Continuation-in-part of Ser. No. 751,398, Dec. 17, 1976, abandoned.

[51] Int. Cl.³ .............................................. G01B 3/18
[52] U.S. Cl. .................................... 33/163; 33/169 R
[58] Field of Search ................ 85/46, 32 R; 74/424.8, 74/424.8 A, 424.8 NA, 441; 33/170, 171, 163, 164, 165, 169 R

[56] References Cited

U.S. PATENT DOCUMENTS

| | | | |
|---|---|---|---|
| 2,447,439 | 8/1948 | Thompson | 74/424.8 A |
| 3,373,497 | 3/1968 | Lewis | 33/170 |

FOREIGN PATENT DOCUMENTS

| | | | |
|---|---|---|---|
| 1096015 | 12/1954 | France | 33/170 |
| 357202 | 11/1961 | Switzerland | 33/170 |
| 26319 | of 1903 | United Kingdom | 33/169 R |
| 194508 | 3/1923 | United Kingdom | 33/170 |

*Primary Examiner*—Harry N. Haroian

[57] ABSTRACT

A precision quick release height gauge having ball bearing contact with a fixed screw wherein the nut element can be released and will disengage the screw, slide freely thereover, and re-engage at will with precise tolerances permitting fabricators to use the quick adjustment release nut for precise instruments, in particular a height gauge in making measurements from one reference to any other given location for layout and machine work.

5 Claims, 9 Drawing Figures

QUICK RELEASE BALL BEARING HEIGHT GAUGE

This is a continuation in part of patent application 190 751,398, filed 12/17/76 Adjustable Ball Bearing Nut now abandoned.

The present invention relates to quick release nuts which can be used on height gauges and various other precision instruments used by machinists and other metal fabricators for the precise location of drill holes and other machine and sheet metal operations in the fabrication or checking of dimensions.

Height gauges and other instruments of a similar nature have an adjustment screw wherein a measurement is made from a reference to the location of, for instance a drill hole. The instrument must screw up to the reference point and then screw all the way to the location indicated on drawings where a particular drill hole is to be located. It is seen then that a great deal of time is wasted in causing the screw to be screwed to any great distance. Furthermore, the friction encountered by extensive screwing shortens the life of the instrument. Moreover, backlash will pose a significant problem. Due to the wearing effect of the extensive screwing the problem gets greater and greater with age making the instrument a very short lived inaccurate tool over its given lifetime. The present inventor has discovered a device which can quick release, slide to a given location establishing a datum plane, zeroing in at that datum plane and then screwing out to the location of the given drill or other machine operation, make the measurement within very precise limits; quick relase a second time; go to a new datum plane and screw out again to another location. The necessity of being in constant engagement with the screw is reduced immensly.

Rolling ball nuts are well known in the art and are utilized extensively because of the minimum friction on machine instruments. The rolling balls are fixed units and the present inventor has discovered a method in which he can quick release such ball bearings and re-engage the same ball bearings again in such a way that a precise minimal friction device can be developed for instruments unknown in the prior art.

Quick relase and even fixed screw devices are plagued with backlash. The present inventor has discovered a method whereby friction and other wearing effects on precise instruments can be adjusted out over the entire life of the instrument. Backlash in the present invention can be held to a minimum, moreover, the instrument can be adjusted or tightened up periodically to minimize and virtually eliminate inaccuracies arising from backlash and other undesirable effects from the wear and inability of instruments of this nature to continue with their original precision, at the same time the device can be more useful because it can be moved from one location to another almost instantly.

Therefore an object of the present invention is to provide a quick release ball bearing precision engagement nut.

Another object of the present invention is to provide a ball bearing engagement nut having adjustment means for reducing backlash.

Another object of the present invention is to provide a quick release ball bearing engagement element for precision tools such as height gauges.

Other objects features and advantages of the present invention will be better understood from a detailed specification especially when read in conjunction with the attached drawings of which:

Figure 1:
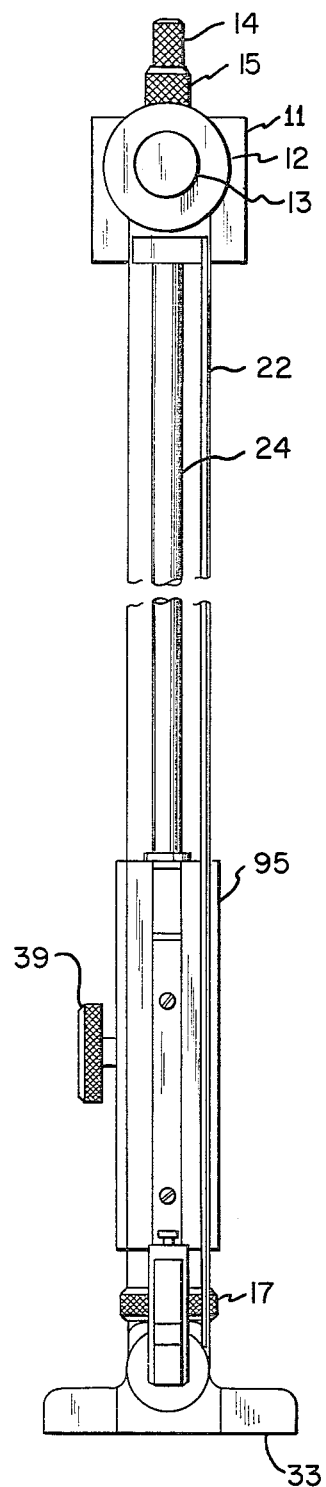
FIG. 1 is a front view of a height gauge in accordance with the present invention.

Referring to FIG. 1, the base 33 of the height gauge 11 is placed on a known surface plate in a machine shop and machined precisely to give a tolerance. A product or device that is being machined of sheet metal, or of steel, is placed along side of it. A user inspects the prints and decides if there is some datum plane from the base which he must check dimensions. The quick release is then lifted at 39 and the indicator 18 is slid over until the device is at the given point indicated on the blue prints. The quick release 39 is then closed, locking the quick release around the thread screw to be explained further. An adjustable unit 12 and 13 control the movement of a continuous band 22 shown in FIG. 2, having scribed scale thereon. Such that the unit is turned till the zero is alined with the indicator 32 on the movable unit 95. Another measurement and adjustment 14, 15 and 17 are coordinated such that the vernier indication 91 is lined up so that movable unit 95 on the screw, has its back lash adjusted to zero. At this point we now have a very tight zero datum plane indication. Then a dimension is taken off of the print. The height gauge is then screwed by means of 15 until the indicator 18 encompasses all of the dimensions till the tolerance is indicated to the new point, and it is read on scale 22, together with the vernier indication at 91. If a new set of dimensions are required from another datum plane the device is again zeroed and the new datum plane and dimensions are shot from that datum plane.

It is seen then, that with the quick release mechanism it is very easy to set the height gauge up, find the datum plane reference on the prints coordinated with the product that is being fabricated and dimensions can be precisely located on any part of the product very quickly and easily. It is also seen that the device can zero out any back lash or other inaccuracies that develop in the device. This will be seen more precisely as we go on.

Figure 2:
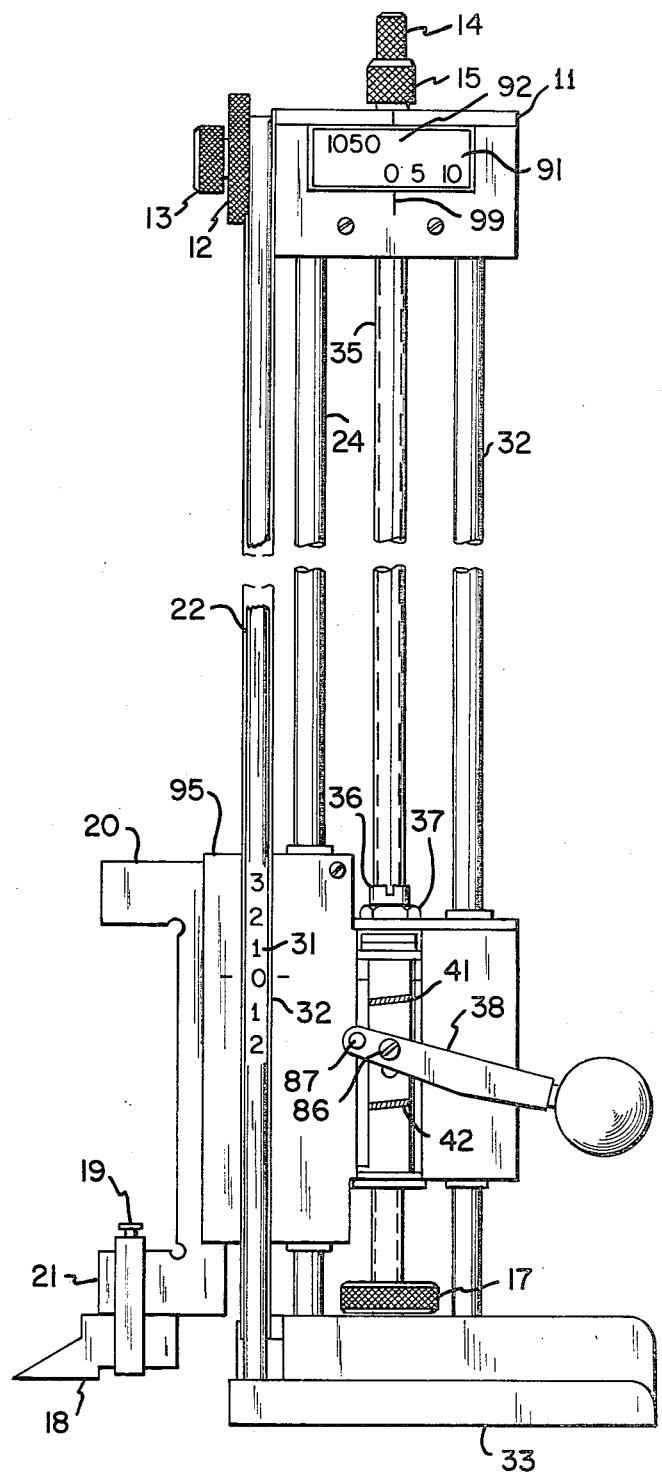
FIG. 2 is a side view of the height gauge.

Referring now, and in particular to FIG. 2, we see the indicator 18 has been mounted on a stud 21. Also shown is an identical stud 20. These are separated by known distances such that the products can be extended 6 inches one way or the other by the movement of 18, by removing screw 19 and taking the indicator and mounting it on the other stud 20. Forty-one and 42 are two rings of ball bearings, and as will be seen further the ball bearings in the release nut make contact with the thread or disengage from the thread providing the quick release necessary to the invention.

FIG. 2 shows 2 posts 24 and 32 posts 24 and 32. These posts are precisely machined units and control the sliding of the movable element 95. The screw element 35 controls the movement of element 95 up or down on the posts 32 and 24. When the quick release 39 is in the engaged position. The screw post 35 is adjustable by 17. The indicator 91 turns with the screw and is zero adjusted and it effectively acts as a vernier for the indicator 22 to show the fine location of the screw coordinated with the movable element.

Summarizing then we see that the whole substance of the idea is that a quick release unit is movable to a given point and then the measuring apparatus is zeroed to that point establishing a datum plane, thereafter measurements can be shot from that datum plane. A new datum plane can be established at any point thereafter and additional measurements can be shot from there. We now take a more detailed look at the quick release unit.

Figure 3:
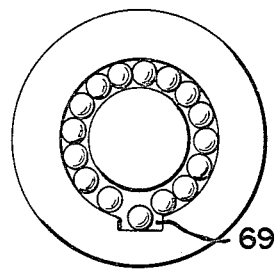
FIG. 3 is the top sectional view in the closed position.
Figure 7:
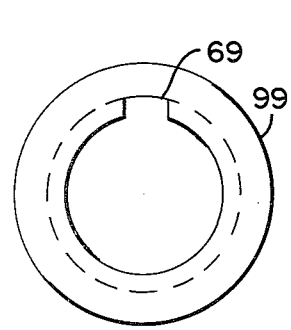
FIG. 7 is a bottom view of a quick release guide.

Referring now to FIG. 3 we see the top view of a section from the quick release unit. Essentially, ball bearings are shown surrounding the thread. The thread is continuous and obviously a ring of balls about the thread must have the ability to go over the crest of one of the threads in order to remain within the device. In FIG. 7, 69 is the opening in the retainer ring 99 which permits the threads and balls to circulate about a given ring of thread and cross over at the crest of the thread to the upper section.

Figure 4:
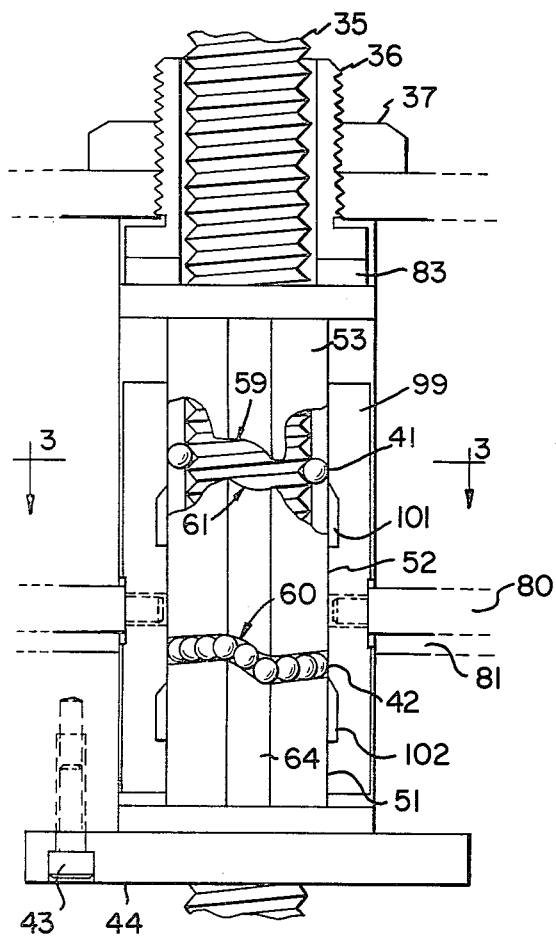
FIG. 4 is a sectional view of the quick release element in the closed position.

Referring now to FIG. 4, we see we have two rings of balls 41 and 42 surrounding the given thread. These rings are separated by segments 53, 52 and 51. The segments as we will see further define a track for the balls to move freely and also provide the space which enables the balls to slide over the crest of the given thread. The contoured surfaces 59 and 60 and 61 are like 68 and permit the balls to rise over a thread at that point. The thread has an angular arrangement as standard threads do and therefore the rings of balls encircling the thread has to rise over the crest of the thread at some point and it is able to do so by the shape of the inserts at this point. Sixty-four defines a raised portion or notch which meets with a slot 69 shown in FIG. 7, making the insert parts 51, 52 and 53 remain lined up with one another. These segments have a notch within them which prevent them from rotating within the unit, and mating slot in the body of the movable element is therefore present. Immediately about these segments is a sleeve 99 which has openings 101 and 102 which enables the balls to move away from the thread permitting the device to slide over the thread until such time as the moves down forcing the balls into contact with the thread again. This sleeve in this unit is shown in a down position and therefore the threads are in contact with the balls and the unit is therefore in, what is referred to, as the closed position.

Referring now to FIG. 4 we see the body has an opening or slot 81 in it, and to the outside a screw connection 80 is attached to the sleeve which controls the movement up and down of this sleeve. That is, of course, attached to pin 86 shown in FIG. 2, which enables 39 to rotate about pivot 87, which is affixed to the body. We note that the bottom of the body 44 is affixed to the remainder of the unit by means of cap screws 43.

Figure 8:
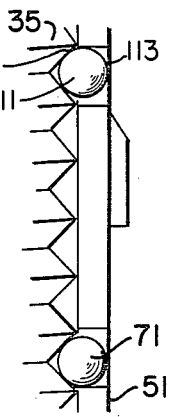
FIG. 8 shows the quick release guide and ball bearings interrelated with the threads.

Referring now to the washer 83, this is a compressible unit and is there to force the sleeve 53 tightly against the bearings which presses against the three pressure points: 111, 112 and 113, see FIG. 8 for more detail. Spacer 52 merely holds the bearings in place when open. The open sleeve 51 also presses against the bottom bearing 71 in the same manner. A screw adjustment 36 turns by means of a slot shown in FIG. 2, to press tightly up against the unit, removing all slack, and then a locking nut 37 is tightened into place. We see the arrows 3—3 which give the indication of the sectional view shown in FIG. 3.

Figure 5:
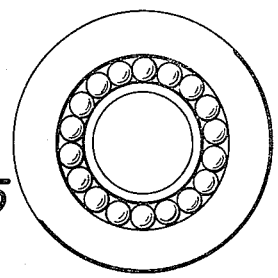
FIG. 5 is a top sectional view in the open position.
Figure 6:
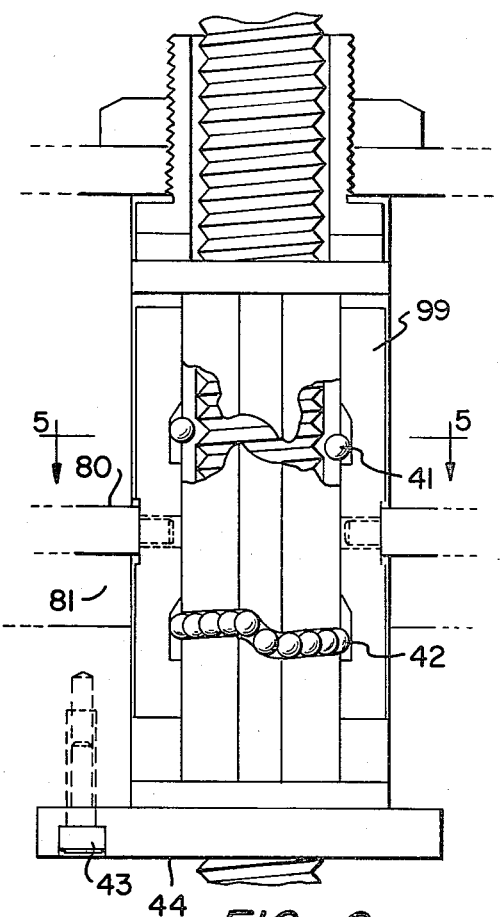
FIG. 6 is a sectional view of the release element to the open position.

Referring now to FIG. 6 we see the exact same unit in FIG. 4 except now the sleeve 99 is now in the open position. And we look for the sectional view 5—5, and we see now the ring of bearings is open in FIG. 5.

FIG. 7 shows an end view of the retainer ring which retains 51, 52 and 53. This ring has a slot 69 which permits the ball to slide up into it, and engages the key way 64 shown in FIG. 9. Elements 51, and 53 slide in and out of position keeping it locked in a particular position.

Referring to FIG. 8 we see the balls 71 and the sleeve 51 and part of threaded shaft 35 in greater detail. It is seen, as explained before, how the various segments 53 and 51 push against the balls which push against the wall of the threads and ring, thereby taking up any slack when they are in an engaged or closed position. Spacer 52 is non functional at that time but when the device is opened it keeps the bearings lined up to be engaged again.

Figure 9:
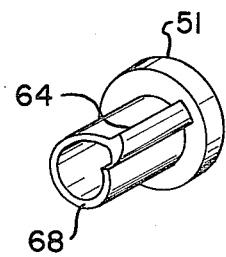
FIG. 9 is a perspective view of the quick release element.

Referring to FIG. 9 we see how the sleeve 51 is fabricated in greater detail with its contoured portion 68 which permits the ring of balls to encircle the thread. The unit is easily assembled and tightened when assembled in manufacture. It is seen here that these are standard machine parts and no further detail is necessary to illustrate them. It is the combination of units with a double ring of balls, the sliding segments and the interrelationship of the sleeves where the invention resides.

Although I have described my invention with reference to specific apparatus, I do not wish to be limited thereby. I only wish to be limited by the appended claims of which:

I claim:

1. An adjustable ball bearing release nut in combination with a precise mechanical locating device comprising, base means release nut means, precision threaded screw means for receiving said nut means attached to said base, location indicating means affixed to said release nut means, ball bearing holder means within said release nut means, thread encircling ball bearing means interposed between the screw thread of said theaded screw means, and a corresponding ball bearing holder means within said release nut means, means for selectively urging said ball bearings of said ball bearing means in and out of screw thread engagement within said release nut means, means for tightening the ball bearings about said precision threaded screw when in an engaged position.

2. An adjustable ball bearing release nut according to claim 1 wherein said ball bearing means includes a multiplicity of thread encircling rings of ball bearings, and means for permitting said rings of balls to bridge the crest of a thread formed between adjacent valleys of said screw threads of said threaded screw means.

3. An adjustable ball bearing release nut according to claim 1 wherein said means for urging said ball bearings into thread engagement is a sliding sleeve within said release nut means having a release channel above said ball bearings whereby the selective movement of said sleeve releases or engages said ball bearings with said screw thread.

4. An adjustable ball bearing release nut according to claim 3 wherein said rings of ball bearings are separated by a spacer sleeve and two retainer sleeves forming channels for receiving said rings of, ball bearings, means for pressing said retainer sleeves against said balls when in an engaged position within said nut whereby slop is eliminated.

5. An adjustable ball bearing release nut according to claim 4 which further includes yieldable washers for maintaining continuous pressure on said retainer sleeve.

* * * * *